Nov. 24, 1942.  A. McK. GREAVES-WALKER  2,302,764
APPARATUS AND METHOD FOR SIMULTANEOUSLY FORMING MALE AND FEMALE MOLDS
Original Filed March 27, 1940  2 Sheets-Sheet 1

Inventor
BY ARTHUR McK. GREAVES-WALKER DEC'D.
ADELAIDE M. GREAVES-WALKER EXECX.
By
Frank Fraser
Attorney Nov. 24, 1942.  A. McK. GREAVES-WALKER  2,302,764
APPARATUS AND METHOD FOR SIMULTANEOUSLY FORMING MALE AND FEMALE MOLDS
Original Filed March 27, 1940   2 Sheets-Sheet 2

Inventor
BY ARTHUR McK. GREAVES-WALKER DEC'D.
ADELAIDE M. GREAVES-WALKER EXECX.
By Frank Fraser
Attorney

Patented Nov. 24, 1942

2,302,764

UNITED STATES PATENT OFFICE

2,302,764

APPARATUS AND METHOD FOR SIMULTANEOUSLY FORMING MALE AND FEMALE MOLDS

Arthur McK. Greaves-Walker, deceased, late of Toledo, Ohio, by Adelaide M. Greaves-Walker, executrix, Toledo, Ohio, assignor to The Libbey-Owens-Ford Glass Company, Toledo, Ohio, a corporation of Ohio Original application March 27, 1940, Serial No. 326,228. Divided and this application April 21, 1941, Serial No. 389,610

6 Claims. (Cl. 25—121)

The present invention relates in general to the shaping of glass sheets or plates to a predetermined curvature and to improvements in shaping molds and to the method of and apparatus for producing the same.

This application is a division of copending application filed by this inventor March 27, 1940, Serial No. 326,228, entitled "Method of and apparatus for use in the shaping of glass sheets or plates."

Heretofore, it has been the usual practice to bend glass sheets either in sand molds or metal molds. The sheet is placed horizontally upon the mold in a furnace and the temperature of both the mold and sheet raised until the glass becomes softened and drops downwardly by gravity to conform to the shape of the mold. The bending of glass sheets in this manner is, however, relatively slow and laborious and such method of bending does not readily lend itself to large scale production.

It is an aim of this invention to overcome the objectionable features incident to the old methods of bending and to render possible the shaping of glass sheets or plates more cheaply, rapidly, and accurately than heretofore and to give a product whose surfaces are smooth and exactly parallel to each other and in no way impaired by the shaping operation.

In carrying out this invention, the glass sheet or plate to be bent is first heated in a furnace and preferably while suspended in a vertical position to a temperature approximating the softening temperature of the glass, after which the highly heated sheet or plate is removed from the furnace and, while still vertically suspended, is pressed to a predetermined curvature by bringing into contact with opposite surfaces thereof suitably shaped male and female pressure elements or shaping molds. The shaping molds are in the nature of forming dies and are adapted to engage opposite surfaces of the glass sheet only momentarily; that is to say, only sufficiently long to effect the shaping thereof. The period of contact of the shaping molds with the glass surfaces is ordinarily less than a second. Thus, this method of shaping glass sheets may be termed "die stamp bending" as it is similar to the cold shaping of metal sheets by a die stamping operation.

By maintaining the glass sheet in a vertical position during the heating and shaping operations, the sheet is prevented from sagging and contacting unduly with surfaces which might mar the same, such as would be the case if the sheet were heated and bent while in a horizontal position. Further, by supporting the glass sheet vertically, and especially by the suspending means herein disclosed, the sheet is free to move under the action of the shaping molds thereby minimizing any tendency of the sheet to become distorted, such as would occur if the sheet were held in a fixed or immovable support.

According to the invention, the shaping molds are formed from a plaster composition such as plaster of Paris or gypsum plaster. The use of plaster molds for shaping glass sheets according to the method herein disclosed is of decided advantage over the use of molds of other materials such as sand molds, iron molds, or wood molds. Obviously, sand molds cannot be employed in the vertical bending of glass sheets. On the other hand, iron molds cannot be satisfactorily used in this method of shaping glass sheets due to the difficulty of maintaining an accurate shape under elevated temperatures. Iron, of course, will grow under heat and because of such growth is uncontrollable. In the method herein provided for shaping glass sheets, a variation of ten-thousandths of an inch in the mold surface has an adverse effect on the finished glass shape. Also, in this method, different portions of the molds engage the heated glass sheet different lengths of time and due to this, iron mold surfaces become distorted as different areas thereof are heated to different temperatures as a result of which the accuracy of the molds is quickly lost. Further, iron molds must be preheated before being brought into engagement with the glass sheets to avoid chill cracks in the glass, which are the result of a greater withdrawal of heat from one portion of the sheet than another. In addition, iron molds have no "give" and therefore tend to produce pressure cracks in the glass sheet due either to ununiform thickness of the sheet or distortion of the molds. Moreover, iron molds are quite heavy; are inconvenient to handle and install; and are generally unsatisfactory for use in the vertical bending of glass sheets.

Wooden molds are also very apt to become distorted from the heat to which they are subjected in the bending operation. In drying, wood has a tendency to shrink and as this shrinkage takes place at elevated temperatures the accuracy of the mold is lost. Further, the hard and soft graining in wooden molds is apt to show on the glass until the surfaces become charred. However, when charred, the wooden surfaces become so soft that they are readily worn away by the bending operation and deteriorate quite rapidly under operating conditions.

On the other hand, it has been found, by actual commercial use, that shaping molds formed of a plaster composition such as plaster of Paris or gypsum plaster can be satisfactorily employed in the shaping of glass sheets by the vertical method of bending herein disclosed and that they are, in fact, far superior to either iron molds or wooden molds. For instance, plaster molds are readily formable to an accurate predetermined shape and may be easily duplicated. Also, such molds will readily withstand the elevated temperatures to which they are subjected and will not become distorted or lose their accuracy even though different portions thereof engage the heated glass sheet different lengths of time during the bending operation. Further, plaster molds will not mar the glass surfaces and have a long life through repeated bending cycles. Plaster molds also do not require preheating nor do they become charred at elevated temperatures. In addition, due to their insulating qualities, plaster molds do not cause chill cracks in the glass and because of their "give" they do not produce pressure cracks. A still further advantage of plaster molds is the ease with which the bending faces thereof may be redressed for radii and surface corrections.

Other objects and advantages of the invention will become more apparent during the course of the following description when taken in connection with the accompanying drawings.

In the drawings, wherein like numerals are employed to designate like parts throughout the same;

Figure 1:
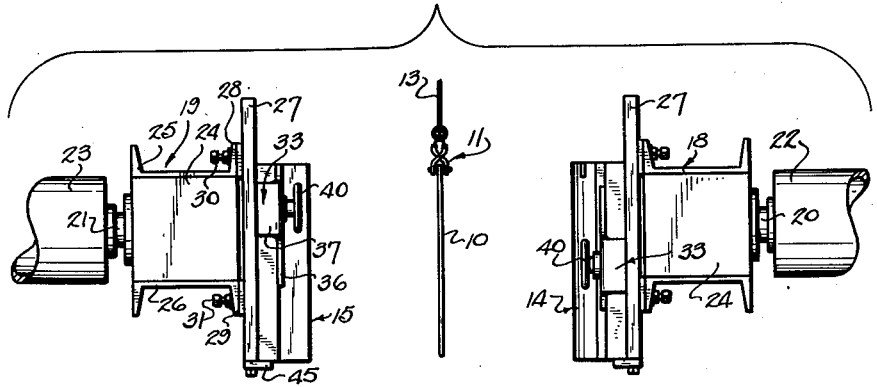
Fig. 1 is an end elevation of a pair of shaping molds provided by the present invention and shown in position for bending a glass sheet therebetween.
Figure 2:
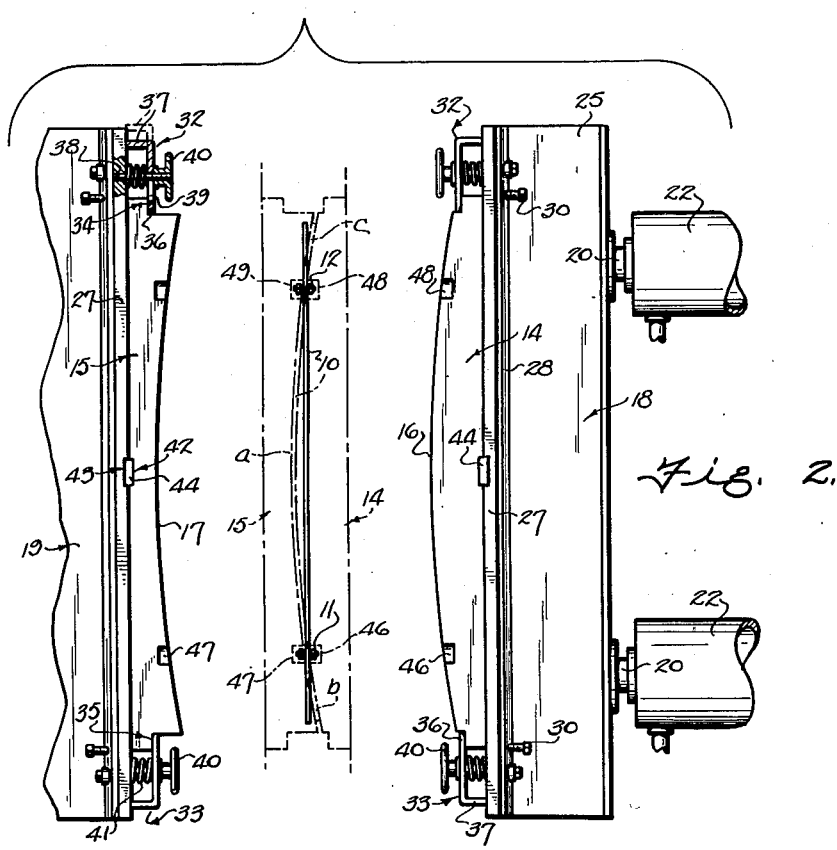
Fig. 2 is a plan view thereof.

With reference particularly to Figs. 1 and 2, a flat sheet of glass 10 to be bent is suspended vertically by a pair of relatively small hooks or tongs 11 and 12 which engage the sheet adjacent its upper edge and also adjacent the opposite ends thereof. These hooks or tongs may be attached by any suitable means 13 to any desired type of support. The flat sheet of glass 10, suspended vertically by means of the tongs 11 and 12, is first heated in a furnace (not shown) until the temperature of the sheet preferably approximates the softening temperature of the glass. The sheet of glass is then removed from the furnace and is immediately bent to the desired curvature.

The shaping of the glass sheet is accomplished by pressing it between the male and female pressure elements or shaping molds 14 and 15 respectively, while still suspended in a vertical position from the tongs 11 and 12. As shown, the shaping molds are disposed at opposite sides of the sheet, with the male mold 14 being provided with a convex bending face 16, and the female mold 15 with a complemental concave bending face 17. Upon horizontal movement of the molds 14 and 15 toward one another, the opposite surfaces of the glass sheet 10 are adapted to be simultaneously engaged by the bending faces 16 and 17 of the molds and the said sheet bent to a predetermined curvature therebetween. The shaping molds 14 and 15 are removably carried by the supporting structure 18 and 19 respectively, having associated therewith horizontal plungers 20 and 21 operating within cylinders 22 and 23 respectively; the horizontal reciprocating movement of said plungers being controlled in any well known manner by hydraulic or air pressure within said cylinders.

Inasmuch as the supporting structure 18 and 19 for the shaping molds 14 and 15 are of the same construction, a description of only one will be given. Thus, each supporting structure includes a horizontal longitudinally extending supporting bar 24 to which the respective horizontal plungers 20 or 21 are secured. Extending along and secured to the upper and lower surfaces of the supporting bar 24 are the channel beams 25 and 26. Arranged inwardly of the supporting bar 24 is a longitudinally extending vertical metal attaching plate 27 which is secured to the flanges 28 and 29 of the channel beams 25 and 26 respectively by screws, bolts, or other suitable fastening means 30 and 31. The front surface of the attaching plate 27 is flat, as is also the back face of the respective shaping mold so that the back face of the mold fits tightly against the front surface of the attaching plate.

The shaping mold is secured to the attaching plate by clamping means 32 and 33 arranged at opposite ends of the mold and engaging shoulders 34 and 35 respectively formed thereon. Each clamping means 32 and 33 comprises an angle member having a front portion 36 and a rearwardly directed end portion 37; the front portion 36 overlapping and engaging the respective shoulder 34 or 35 on the mold, while the end portion 37 engages the front surface of the attaching plate 27. Carried by the attaching plate is a forwardly extending bolt 38 passing through a slot 39 in the front portion 36 of the clamping member and having threaded thereon a nut 40. By tightening the nuts 40 of clamping means 32 and 33, the front portions 36 of the clamping members will engage the shoulders 34 and 35 on the mold and act to clamp said mold firmly against the attaching plate.

In order to automatically disengage the clamping members from the shaping mold upon loosening of the nuts 40, there is provided a compression spring 41 encircling each bolt 38. When the nuts 40 are loosened, the springs 41 will urge the clamping members outwardly so that they can be readily moved laterally by the operator to broken line position indicated in Fig. 2, whereupon the mold can be readily removed. It is essential in the shaping of glass sheets according to this method that the male and female shaping molds 14 and 15 be in perfect alignment with one another both vertically and horizontally. This is especially true in the making of compound bends in vertical and horizontal directions. To facilitate the positioning of the shaping molds with respect to the attaching plates 27 and to also line up the two molds vertically with one another, each mold and attaching plate are provided with mating vertical grooves 42 and 43 respectively for receiving therein a key 44. For the purpose of supporting the molds and for aligning them horizontally with one another, there is secured to the bottom edge of each attaching plate 27 a horizontal metal supporting strip 45 upon which the bottom edge of the mold rests. Thus, rapid and accurate installation of the mold in the machine is provided for.

The shaping molds 14 and 15 are preferably of such size, both as to height and width, that the glass sheet 10, when brought into position therebetween for bending, is disposed entirely within the area of the molds. That is to say, the glass sheet does not project beyond the molds either at the top or bottom or at the opposite sides thereof, as will be seen in Figs. 1 and 2. It has been found that when the glass sheet is arranged in this manner, the liability of breaking or cracking of the glass during bending is reduced. When the glass sheet projects either above or beneath the molds so that said molds do not engage the entire area of the sheet, there is a tendency for so-called chill cracks to develop in the glass.

In order to suspend the glass sheet in this manner between the shaping molds, it is of course necessary that the lower ends of the hooks or tongs 11 and 12 be disposed between the upper portions of said molds as seen in Fig. 1. To permit the molds to be moved together to effect the shaping of the glass sheet without interference from the said tongs, the male and female molds 14 and 15 are provided at their upper ends with opposed recesses or notches 46—47 respectively for receiving the tong 11 and with similar recesses or notches 48—49 for receiving the tong 12 when the said molds are moved together. The manner in which the tongs are received within the recesses and also the manner in which the glass sheet is bent upon closing of the molds is clearly shown in broken lines in Fig. 2.

Another feature of the invention consists in the positioning of the tongs 11 and 12 so that upon shaping of the glass sheet the tongs will remain in the same or substantially the same position. The flat sheet of glass 10 to be bent is shown in full lines in Fig. 2, and this sheet is suspended from the hooks or tongs 11 and 12 engaging the same adjacent its opposite vertical side edges. In operation, the male mold 14 is moved inwardly to engage the adjacent surface of the glass sheet 10 at a point intermediate the tongs 11 and 12, while the female mold 15 is simultaneously moved inwardly to engage the opposite side edge portions of the sheet outwardly of the tongs. Upon continued movement of the molds toward one another, the central portion of the glass sheet between the tongs will be bent in one direction as indicated at a, while the side edge portions of the sheet outwardly of the tongs will be simultaneously bent in the opposite direction as at b and c. This bending operation will continue until the molds are closed and the sheet assumes its final predetermined curvature as shown by the broken lines in Fig. 2. When the molds are closed, the tongs 11 and 12 will be received within the recesses 46—47 and 48—49 respectively in said molds as explained above.

As will also be apparent from Fig. 2, the tongs 11 and 12 are so arranged prior to the bending of the sheet that they have very little, if any movement during the shaping operation. This is due to the fact that the central portion a of the sheet between the tongs is bent in one direction in an amount substantially equal to the degree of bend of the side edge portions b and c of the sheet in the opposite direction. In other words, the tongs 11 and 12 are so positioned that a line extending parallel to the cord of the curve given the glass sheet and passing through the tongs will bisect the rise or curvature of the glass sheet after bending. The positioning of the tongs will of course depend upon the curvature to be given the glass sheet and the position of the notches in the bending molds will of course also be varied accordingly.

After the glass sheet 10 has been pressed to the desired shape, it can either be annealed by a slow and gradual cooling thereof or, if preferred, the said sheet can be tempered by subjecting it to a sudden cooling or chilling treatment as well known in the art.

As brought out above, the pressure elements or shaping molds 14 and 15 are formed from a plaster composition such as plaster of Paris or gypsum plaster and also that the use of such molds in the shaping of glass sheets according to the method above described is attendant with various important practical advantages over the use of iron or wood molds. Further, that in this method, the shaping molds contact with the glass sheet only long enough to bend it to the desired curvature and that this period of engagement is ordinarily not more than one second. The molds are preferably actuated so that they move to bending position, perform the bending operation, and return to retracted position within about two seconds. Consequently, very little time is required to shape the sheet to its desired form, and, in fact, this method of bending is quite similar to the die stamping of metal sheets. The plaster molds herein provided do not have to be preheated prior to bending and even though certain areas of the molds contact the glass sheet for a longer period of time than others, they still do not become distorted or lose their accuracy or ununiformly cool the sheet, such as is apt to cause chill cracks in the glass.

It might be pointed out here that it has been heretofore proposed to use plaster molds for bending glass sheets according to the old methods of bending, in which the molds and glass sheets are placed in a furnace and heated to a temperature sufficient to cause the glass to soften and conform to the shape of the molds. However, the use of plaster molds in such methods has never proven satisfactory because they rapidly deteriorated under the elevated temperatures to which they were subjected. In such methods, the molds and glass sheets are usually heated to a maximum temperature of around 1200° F. over a twenty-four hour bending cycle. This time and temperature cycle is such that complete calcination (breaking up and loss of bond) of the entire plaster mass takes place before a single commercially satisfactory bend can be made. The plaster molds, when first cast, contain an excess amount of water which is expelled during the drying and setting of the plaster, but there still remains a relatively large percentage of moisture (approximately 20%) after drying and which is chemically combined with the gypsum crystals. When used in the old methods, the elevated temperatures to which the molds were subjected in the furnace was sufficient to drive off the combined water from the mass resulting in complete calcination and disintegration of the molds. Different ways were suggested of protecting the molds from the heat, such as by embedding them in sand, but no way has been found which will permit their use successfully in such methods.

It has been discovered, however, that notwithstanding the failure of plaster molds in the old methods of furnace bending, such molds can be satisfactorily employed in the method herein disclosed and in fact with much more satisfactory results than either iron or wood. Thus, if the water which is chemically combined with the gypsum crystals is not expelled during the bending operation, plaster molds can be successfully used in the shaping of glass sheets. In the shaping of glass sheets according to my method, the evaporation of the chemically combined water in the molds is greatly retarded and, in fact, to such an extent that the molds can be used over a relatively long period of time for making a large number of repeated bends accurately and uniformly and without marring the glass.

In the shaping of glass sheets according to this method, the plaster molds are subjected to a body temperature not much in excess of 160° F. except the front face thereof which contacts the heated glass sheet. Further, the plaster molds are exposed to the atmosphere, and due to the fact that they have low thermal conductivity, there is relatively little flow of heat from the face of the mold into the body thereof. This insulating quality of the mold increases as the face thereof becomes burned or calcined which further reduces evaporation by retarding the flow of heat from the face of the mold into the body thereof. Evaporation is also retarded by mounting the mold flat against the attaching plate 27. As is well known, moisture runs from heat, and as heat enters the mold through the front face thereof, the moisture will run to the back of the mold. However, as the mold lies flat against the metal attaching plate, no evaporation is allowed from the rear face of the mold. The rear face and edges of the mold may also be coated with shellac or the like to further impede the loss of moisture from the plaster mass; or, a relatively thin rubber sheet may be arranged between the back of the mold and the metal attaching plate. Therefore, by exposing the plaster mold to the atmosphere, by maintaining it at a body temperature not much in excess of the calcining temperature thereof, which is approximately 140° F., and retarding evaporation of moisture from the rear face of the mold, it has been found that such molds can be successfully used in the shaping of glass sheets by the method herein disclosed. These plaster molds will bend the glass without surface distortion and have a high degree of permanency of radius and surface.

Figure 3:
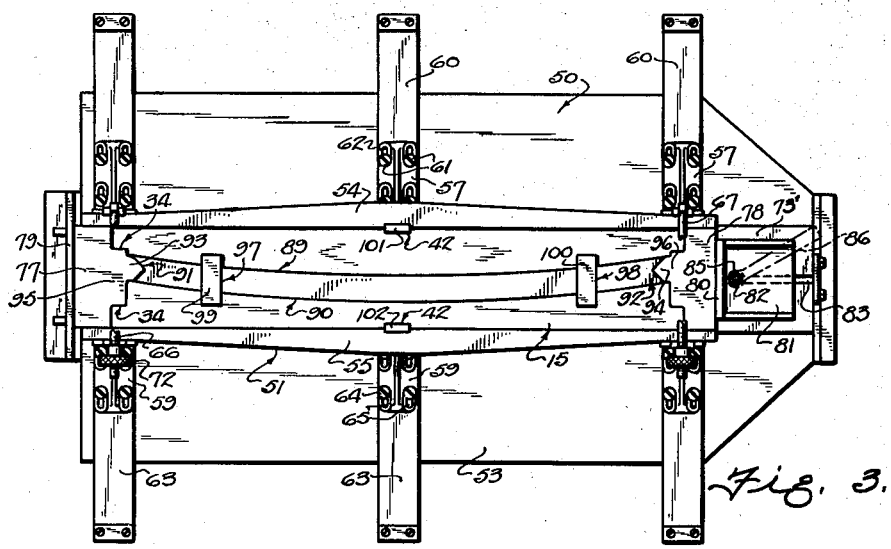
Fig. 3 is a plan view of the apparatus employed in making the shaping molds.
Figure 4:
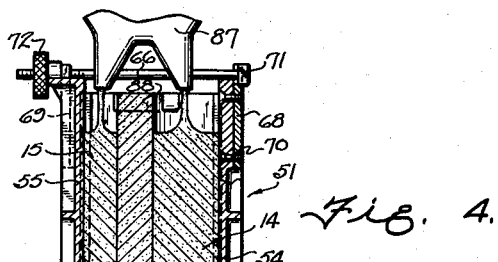
Fig. 4 is a vertical transverse section taken substantially on line 4—4 of Fig. 3.
Figure 5:
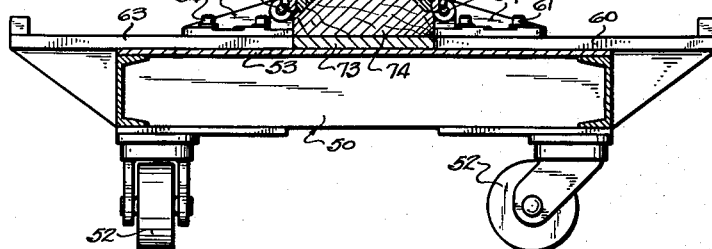
Fig. 5 is a detail section taken substantially on line 5—5 of Fig. 3.

The method of and apparatus employed in producing the shaping molds 14 and 15 is illustrated in Figs. 3 and 4 of the drawings and will now be described in detail. The apparatus comprises generally a portable carriage 50 having mounted thereupon the forming mold 51. The carriage 50 is provided with wheels or casters 52 and includes a horizontal, substantially rectangular top 53. The forming mold 51 comprises metal side walls 54 and 55 extending longitudinally of the carriage and having flat inner surfaces. The side wall 54 is pivotally mounted at its lower end as at 56 to a plurality of bracket plates 57, while the side wall 55 is pivotally mounted at its lower end as at 58 to a plurality of bracket plates 59. The bracket plates 57 are secured upon transverse supporting strips 60 carried by the top 53 of the carriage by screws or the like 61 which pass through slots 62 in said bracket plates, so that the side wall 54 can be adjusted bodily inwardly or outwardly. The bracket plates 59 are similarly mounted upon transverse supporting strips 63 by screws or the like 64 which pass through slots 65 in said bracket plates, also permitting inward or outward bodily adjustment of the side wall 55.

Due to the pivotal mounting of the side walls 54 and 55, they can be swung either to a horizontal position or a vertical position. To maintain the side walls in vertical position, which is the position they assume during the casting of the molds 14 and 15, there are provided the transverse retaining bolts 66 and 67 at opposite ends of the forming mold 51. Each of the retaining bolts 66 and 67 is loosely received within vertical slots formed in the upper ends of plates 68 and 69 secured to the side walls 54 and 55 respectively by screws or the like 70. One end of each retaining bolt is provided with a head 71, while threaded upon the opposite end is a nut 72. Upon tightening of the nuts 72, the upper ends of the side walls 54 and 55 can be drawn together and the said walls maintained in proper vertical position or, in other words, in spaced parallel relation.

Extending longitudinally of the top 53 of carriage 50 and disposed between the inner adjacent ends of the transverse supporting strips 60 and 63 is a plate 73 upon which is supported a second plate 74 of wood, plaster or the like and constituting the bottom of the forming mold. The upper portion of the bottom wall 74 is received between the lower ends of the side walls 54 and 55. Carried upon the inner surfaces of the side walls 54 and 55 at the lower ends thereof are the longitudinally extending metal strips 75 and 76 respectively. The metal strips 75 and 76 are associated with and bear the same relation to the side walls 54 and 55 of the forming mold as the metal supporting strips 45 bear to the vertical attaching plates 27. (Fig. 1.) Further, the upper surfaces of the strips 75 and 76 are preferably machined as are also the upper surfaces of the supporting strips 45. Thus, the metal strips 75 and 76 serve to line up the bottom edges of the shaping molds 14 and 15 during the formation thereof so that when the molds are placed upon the supporting strips 45 and secured against the attaching plates 27, they will be in exact horizontal alignment with one another.

The end walls of the forming mold 51 consists of vertically disposed blocks 77 and 78 also preferably of plaster and clamped in place between the side walls 54 and 55. In fact, the end walls 77 and 78 serve to properly space the side walls 54 and 55 from one another. The end wall 77 is prevented from moving outwardly by a fixed vertical plate 79 secured to the carriage 50, while the end wall 78 is held against outward movement by a movable angle plate 80 having a base 81 resting upon the projecting end portion 73' of plate 73. The angle plate 80 is preferably adjustable inwardly or outwardly and to this end carries a bolt 82 passing vertically therethrough and also through a slot 83 in the plate extension 73'. The head 84 of bolt 82 is disposed beneath the plate extension 73', while threaded upon the upper end of the bolt is a nut 85. When the nut 85 is loosened, the angle plate 80 can be moved inwardly or outwardly as desired, whereas upon tightening of the nut the said plate is secured in place. The adjustment of the nut 85 may be effected by means of a suitable wrench 86.

In Figs. 3 and 4, the numeral 88 designates the master mold which is also preferably formed of a plaster composition. The master mold 88 consists of a substantially vertical plate member of concave-convex formation, having its opposite surfaces 89 and 90 curved to correspond to the curved bending faces to be given the shaping molds. Thus, the surface 89 of the master mold is concave to form the convex bending face 16 of mold 14, while the surface 90 is convex to form the concave bending face 17 of mold 15. When it is desired to form a pair of male and female shaping molds, the master mold 88 is first mounted in place between the side walls 54 and 55 and in spaced relation thereto to form cavities at opposite sides of the master mold. The master mold is supported upon the bottom 74 of the forming mold and is provided in its opposite vertical end edges with V-shaped grooves 91 and 92 for receiving therein the pointed inner edges 93 and 94 of the ends walls 77 and 78 respectively of the forming mold, whereby the master mold is held firmly against lateral shifting movement during the casting of the shaping molds. After the master mold has been secured in place, gypsum plaster or other plaster composition is poured into the space or cavity between the master mold and side wall 54 to form the male shaping mold 14, and also into the space or cavity between the master mold and side wall 55 to form the female shaping mold 15. In Fig. 4, the plaster is shown as being deposited within the cavities at opposite sides of the master mold 88 from a funnel 87.

The inner portions 95 and 96 of the end walls 77 and 78 of the forming mold are reduced in width to form upon the shaping molds 14 and 15 the shoulders 34 and 35 at the opposite ends thereof to receive the clamping means 32 and 33. In order to form the notches 46—47 and 48—49 in the shaping molds for the reception of the tongs 11 and 12, as described above, there are inserted within recesses 97 and 98 formed in the upper edge of the master mold 88 transverse blocks 99 and 100 and the pouring of the plaster about these blocks results in the formation of the notches. Likewise, there are carried by the side walls 54 and 55 vertically disposed key strips 101 and 102 which project inwardly of said walls and form the grooves 42 provided for the reception of the keys 44 when the shaping molds are secured in position as illustrated in Fig. 2.

After the plaster has been poured into the forming mold at opposite sides of the master mold 88, it is permitted to set for a desired length of time, whereupon the shaping molds 14 and 15 are removed from the forming mold and introduced into a drying oven wherein the excess or surplus water is expelled from the plaster. Upon being removed from the drying oven, the shaping molds are ready for use and can be associated with the supporting structure 18 and 19 (Figs. 1 and 2) in the manner above described. The shaping molds can be removed from the forming mold by loosening the nuts 72 and removing the bolts 66 and 67, whereupon the side walls 54 and 55 of the forming mold can be swung outwardly and downwardly to horizontal position. In order to prevent the shaping molds from sticking to the master mold during the setting of the plaster, the opposite surfaces of the master mold are preferably provided with a so-called parting layer which may consist in first coating the master mold with shellac and then with a soap solution which renders the master mold impervious to moisture. The removal of the shaping molds from the forming mold will also be facilitated by the metal strips 75 and 76. Thus, when the side walls 54 and 55 are swung outwardly and downwardly, the metal strips 75 and 76 will tend to raise the shaping molds and separate them from the master mold 88.

It is preferred that the master mold 88 be formed in the following way. Thus, there are preferably provided a pair of pattern molds similar in shape and size to the molds 14 and 15 and preferably cut from hardened blocks of plaster. These pattern molds are placed inwardly of the side walls 54 and 55 and properly associated with the end walls 77 and 78. The space between the pattern molds corresponds to the shape and size of master mold desired. Plaster is then poured into the space between the pattern molds to form the master mold, after which the pattern molds are removed and the cavities resulting from their removal filled with plaster to form the shaping molds. A suitable parting compound is also applied to the inner faces of the pattern molds before the master mold is cast so that the master mold will not adhere to the pattern molds. The recesses 97 and 98 in the upper edge of the master mold can be suitably cut therein after it is formed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

It is claimed:

1. In an apparatus for producing a pair of male and female molds of a plaster composition for use in the shaping of glass sheets, comprising a forming mold including a bottom and vertical side and end walls, a master mold extending between said end walls in spaced relation to said side walls and cooperating with said side and end walls to provide mold cavities at opposite sides of the master mold corresponding to the molds to be formed and adapted to receive the plaster composition, the opposite surfaces of said master mold being curved to correspond to the curvature to be given the front face of the male and female shaping molds, said master mold also having recesses formed in its upper edge, and transverse blocks received in said recesses and projecting beyond opposite sides of the said master mold to form opposed notches in the said male and female molds.

2. In an apparatus for producing a pair of male and female molds of a plaster composition for use in the shaping of glass sheets, comprising a forming mold including a bottom and vertical side walls and end walls arranged between said side walls, a master mold extending between said end walls in spaced relation to said side walls and cooperating with said side and end walls to provide mold cavities at opposite sides of the master mold corresponding to the male and female molds to be formed and adapted to receive the plaster composition, the opposite surfaces of said master mold being curved to correspond to the curvature to be given the front faces of the male and female shaping molds, said master mold and end walls having interlocking tongue and groove portions for maintaining the said master mold in proper position, and means for connecting said side walls together and for clamping the end walls therebetween.

3. In an apparatus for producing a pair of male and female molds of a plaster composition for use in the shaping of glass sheets, comprising a forming mold including a bottom and vertical side walls and end walls arranged between said side walls, a master mold extending between said end walls in spaced relation to said side walls and cooperating with said side and end walls to provide mold cavities at opposite sides of the master mold corresponding to the male and female molds to be formed and adapted to receive the plaster composition, the opposite surfaces of said master mold being curved to correspond to the curvature to be given the front faces of the male and female shaping molds, and means carried upon the inner surfaces of said side walls adjacent the lower ends thereof for lining up the bottom edges of the said male and female molds.

4. The method of simultaneously producing a pair of male and female molds of a plaster composition for use in the shaping of glass sheets, comprising first forming a pair of pattern molds similar to the male and female molds to be produced, positioning said pattern molds in spaced relation to form a cavity therebetween, depositing a plaster composition in said cavity to form a master mold, drying said master mold, removing the pattern molds from opposite sides of said master mold, filling the cavities resulting from the removal of the pattern molds with a plaster composition to form the male and female molds, and then drying said last-named molds.

5. An apparatus for producing a pair of male and female molds of a plaster composition for use in the shaping of glass sheets, comprising a forming mold including a bottom and vertical side and end walls, means for pivotally mounting said side walls at their lower ends, a master mold extending between said end walls in spaced relation to said side walls and cooperating with said side and end walls to provide mold cavities at opposite sides of the master mold corresponding to the male and female molds to be formed and adapted to receive the plaster composition, the opposite surfaces of said master mold being curved to correspond to the curvature to be given the front faces of the male and female molds, said master mold and end walls having interlocking tongue and groove portions for maintaining the said master mold in proper position, said master mold also having recesses formed in its upper edge, and transverse blocks received in said recesses and projecting beyond opposite sides of the said master mold to form opposed notches in the said male and female molds.

6. An apparatus for producing a pair of male and female molds of a plaster composition for use in the shaping of glass sheets, comprising a forming mold including a bottom and vertical side walls and end walls arranged between said side walls, means for pivotally mounting said side walls at their lower ends, a master mold extending between said end walls in spaced relation to said side walls and cooperating with said side and end walls to provide mold cavities at opposite sides of the master mold corresponding to the male and female molds to be formed and adapted to receive the plaster composition, the opposite surfaces of said master mold being curved to correspond to the curvature to be given the front faces of the male and female shaping molds, means carried upon the inner surfaces of said side walls adjacent the lower ends thereof for lining up the bottom edges of the said male and female molds, and vertically disposed key strips carried upon the inner surfaces of the side walls of the forming mold to form aligned vertical grooves in the male and female molds which facilitate lining up of said molds with one another when mounted.

ADELAIDE M. GREAVES-WALKER,
Executrix of the Estate of Arthur McK. Greaves-Walker, Deceased.